(12) United States Patent
Lei et al.

(10) Patent No.: US 12,500,651 B2
(45) Date of Patent: Dec. 16, 2025

(54) TECHNIQUES FOR RETRANSMITTING RANDOM ACCESS MESSAGES IN WIRELESS COMMUNICATIONS

(71) Applicant: QUALCOMM Incorporated, San Diego, CA (US)

(72) Inventors: Jing Lei, San Diego, CA (US); Wanshi Chen, San Diego, CA (US); Peter Gaal, San Diego, CA (US); Joseph Binamira Soriaga, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 17/812,778

(22) Filed: Jul. 15, 2022

(65) Prior Publication Data
US 2022/0353939 A1    Nov. 3, 2022

Related U.S. Application Data

(62) Division of application No. 16/783,985, filed on Feb. 6, 2020, now Pat. No. 11,445,561.
(Continued)

(51) Int. Cl.
*H04W 76/18* (2018.01)
*H04B 7/06* (2006.01)
(Continued)

(52) U.S. Cl.
CPC ....... *H04B 7/06964* (2023.05); *H04L 1/0003* (2013.01); *H04L 1/1816* (2013.01);
(Continued)

(58) Field of Classification Search
CPC ... H04W 76/18; H04W 72/046; H04W 72/23; H04W 74/0833; H04W 74/004;
(Continued)

(56) References Cited

U.S. PATENT DOCUMENTS 10,555,345 B2    2/2020   Vajapeyam et al.
11,109,247 B2*   8/2021   Chen ................ H04W 74/08
(Continued)

FOREIGN PATENT DOCUMENTS

KR    20140009046 A     1/2014
WO    WO-2010008859     1/2010
(Continued)

OTHER PUBLICATIONS

ZTE, Sanechips, Considerations on 2-Step RACH Procedures, 3GPP TSG RAN WG1 Meeting #96, Athens, Greece, Feb. 25-Mar. 1, 2019, (document uploaded on Feb. 16, 2019), R1-1901627. (Year: 2019).*
(Continued)

*Primary Examiner* — Fahmida S Chowdhury
(74) *Attorney, Agent, or Firm* — ArentFox Schiff, LLP

(57) ABSTRACT

Aspects described herein relate to determining a failure associated with reception, by a base station, of an initial transmission of a random access message transmitted by the UE in a two-step random access procedure, and based on determining the failure situations associated with reception of the random access message, configuring the parameters of a retransmission and/or retransmitting at least a portion of the random access message.

7 Claims, 8 Drawing Sheets

Related U.S. Application Data

(60) Provisional application No. 62/811,352, filed on Feb. 27, 2019.

(51) Int. Cl.
   *H04L 1/00* (2006.01)
   *H04L 1/1812* (2023.01)
   *H04W 72/044* (2023.01)
   *H04W 72/23* (2023.01)
   *H04W 74/0833* (2024.01)
   *H04W 74/0836* (2024.01)

(52) U.S. Cl.
   CPC ......... *H04W 72/046* (2013.01); *H04W 72/23* (2023.01); *H04W 74/0836* (2024.01); *H04W 76/18* (2018.02)

(58) Field of Classification Search
   CPC .. H04W 74/008; H04L 1/0003; H04L 1/1816; H04L 2001/0093; H04L 1/0009; H04L 1/0025; H04L 1/06; H04L 1/1671; H04L 1/1825; H04L 1/1864; H04L 1/1893; H04B 7/088; H04B 7/0695
   See application file for complete search history.

(56) References Cited

U.S. PATENT DOCUMENTS

| | | | | |
|---|---|---|---|---|
| 11,690,050 | B2* | 6/2023 | Gao | H04W 72/04 370/329 |
| 2010/0041428 | A1 | 2/2010 | Chen et al. | |
| 2014/0016573 | A1* | 1/2014 | Nuggehalli | H04W 52/42 370/328 |
| 2018/0332625 | A1* | 11/2018 | Tsai | H04B 7/06966 |
| 2018/0352491 | A1* | 12/2018 | Shih | H04W 36/144 |
| 2019/0104552 | A1* | 4/2019 | Hui | H04W 74/0833 |
| 2019/0254082 | A1* | 8/2019 | Takeda | H04W 52/50 |
| 2019/0319748 | A1* | 10/2019 | Nam | H04L 27/2665 |
| 2019/0320467 | A1* | 10/2019 | Freda | H04L 5/0055 |
| 2020/0052767 | A1* | 2/2020 | Wang | H04W 74/0833 |
| 2020/0100154 | A1* | 3/2020 | Cirik | H04B 7/088 |
| 2020/0154326 | A1* | 5/2020 | Deenoo | H04W 36/00837 |
| 2020/0170043 | A1* | 5/2020 | Fu | H04W 72/23 |
| 2020/0187259 | A1* | 6/2020 | Liu | H04B 7/088 |
| 2020/0267768 | A1* | 8/2020 | Hakola | H04L 5/0091 |
| 2020/0275505 | A1* | 8/2020 | Lei | H04W 76/18 |
| 2020/0288503 | A1* | 9/2020 | Sahlin | H04B 7/06968 |
| 2020/0336188 | A1* | 10/2020 | Wang | H04B 7/0628 |
| 2020/0344810 | A1* | 10/2020 | Xiong | H04W 56/0015 |
| 2021/0007139 | A1* | 1/2021 | Fu | H04L 5/0094 |
| 2021/0022187 | A1* | 1/2021 | Xu | H04L 1/1671 |
| 2021/0176670 | A1* | 6/2021 | Keskitalo | H04L 5/0048 |
| 2022/0353939 | A1* | 11/2022 | Lei | H04L 1/1816 |

FOREIGN PATENT DOCUMENTS

| | | |
|---|---|---|
| WO | 2016123429 | 8/2016 |
| WO | WO-2018064367 A1 | 4/2018 |
| WO | WO-2018111461 A1 | 6/2018 |

OTHER PUBLICATIONS

Nokia, Nokia Shanghai Bell, on 2-step RACH Procedure, 3GPP TSG RAN WG1 Meeting #96, Athens, Greece, Feb. 25-Mar. 1, 2019, (document uploaded on Feb. 15, 2019), R1-1902136. (Year: 2019).*

Taiwan Search Report—TW109103871—TIPO—Nov. 16, 2023.

Ericsson: "Procedures for NoMA", 3GPP Draft, 3GPP TSG-RAN WG1 Meeting#95, R1-1813256, Procedures for NoMA, 3RD Generation Partnership Project (3GPP), Mobile Competence Centre, 650, Route Des Lucioles, F-06921, Sophia-Antipolis Cedex, France, vol. Ran WG1, No. Spokane, USA; Nov. 12, 2018-Nov. 16, 2018, Nov. 11, 2018 (Nov. 11, 2018), XP051555272, 5 pages.

International Preliminary Report on Patentability—PCT/US2020/017275, The International Bureau of WIPO—Geneva, Switzerland, Sep. 10, 2021.

International Search Report and Written Opinion—PCT/US2020/017275—ISA/EPO—Jul. 13, 2020.

Nokia, et al., "On 2-Step RACH Procedure", 3GPP Draft, 3GPP TSG RAN WG1 Meeting #96, R1-1902136, On 2-step RACH Procedure, 3rd Generation Partnership Project (3GPP), Mobile Competence Centre, 650, Route Des Lucioles, F-06921 Sophia-Antipolis Cedex, France, vol. Ran WG1, No. Athens, Greece, Feb. 25, 2019-Mar. 1, 2019, Feb. 15, 2019 (Feb. 15, 2019), XP051599831, 10 pages.

Partial International Search Report—PCT/US2020/017275—ISA/EPO—May 14, 2020.

Qualcomm Incorporated: "Channel Structure for Two-Step Rach", 3GPP Draft, 3GPP TSG-RAN WG1 Meeting #96, R1-1902977, Channel Structure for Two-Step RACH, 3rd Generation Partnership Project (3GPP), Mobile Competence Centre, 650, Route Des Lucioles, F-06921, Sophia-Antipolis Cedex, France, vol. Ran WG1, No. Athens, Greece, Feb. 25, 2019-Mar. 1, 2019, Feb. 16, 2019 (Feb. 16, 2019), XP051600674, pp. 1-10.

ZTE, et al., "Considerations on 2-Step RACH Procedures", 3GPP Draft, 3GPP TSG RAN WG1 Meeting #96, R1-1901627, Considerations on 2-Step RACH Procedures, 3rd Generation Partnership Project (3GPP), Mobile Competence Centre, 650, Route Des Lucioles, F-06921 Sophia-Antipolis Cedex, France, vol. Ran WG1, No. Athens, Greece, Feb. 25, 2019-Mar. 1, 2019, Feb. 16, 2019 (Feb. 16, 2019), XP051599324, 11 pages, Retrieved from the Internet: URL: http://www.3gpp.org/ftp/tsg%5Fran/WG1%5FRL1/TSGR1%5F96/Docs/R1%2D1901627%2Ezip. [retrieved on Feb. 16, 2019], p. 1, figure 1 p. 2, paragraph 2.1 p. 4, paragraph 3.1 p. 8, paragraph 3.5-p. 9, p. 3, line 10-line 20.

ZTE: "Discussion on Draft CRs on Beam Management", R1-1812266, 3GPP TSG RAN WG1 Meeting #95 Spokane, USA, Nov. 12-16, 2018, Server Release Date Nov. 3, 2018, 7 Pages.

* cited by examiner

TECHNIQUES FOR RETRANSMITTING RANDOM ACCESS MESSAGES IN WIRELESS COMMUNICATIONS

CLAIM OF PRIORITY UNDER 35 U.S.C. § 119

The present application for patent is a divisional application of U.S. Non-Provisional application Ser. No. 16/783,985 entitled "TECHNIQUES FOR RETRANSMITTING RANDOM ACCESS MESSAGES IN WIRELESS COMMUNICATIONS" filed Feb. 6, 2020, which claims priority to Provisional Application No. 62/811,352, entitled "TECHNIQUES FOR RETRANSMITTING RANDOM ACCESS MESSAGES IN WIRELESS COMMUNICATIONS" filed Feb. 27, 2019, which is assigned to the assignee hereof and hereby expressly incorporated by reference herein for all purposes.

BACKGROUND

Aspects of the present disclosure relate generally to wireless communication systems, and more particularly, to random access procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a user equipment (UE) can use a random access procedure to establish a connection with a base station. A random access procedure can typically include four steps of messages communicated between the UE and base station to establish the connection. Recent proposals have introduced a two-step random access procedure where the UE transmits a first message including a random access preamble and a payload in a shared random access occasion, and the base station receiving the first message can transmit a second message including a random access response (e.g., to the random access preamble) and contention resolution information. The first message can include two separate transmissions (e.g., in time) of the preamble and payload portions of the message, and the gap between the preamble transmission and the payload transmission is configurable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes determining, by a user equipment (UE), a failure associated with reception, by a base station, of an initial transmission of a random access message transmitted by the UE in a two-step random access procedure, and transmitting, by the UE to the base station and based on determining the failure, a retransmission of at least a portion of the random access message.

In another aspect, a method for wireless communications is provided. The method includes receiving, from a UE, a random access message transmitted by the UE in a two-step random access procedure, determining whether the random access message is an initial transmission or a retransmission of the random access message, and decoding the random access message based on determining whether the random access message is the initial transmission or the retransmission.

In another aspect, an apparatus for wireless communication is provided that includes a transceiver, a memory configured to store instructions, and one or more processors communicatively coupled with the transceiver and the memory. The one or more processors are configured to determine a failure associated with reception, by a base station, of an initial transmission of a random access message transmitted in a two-step random access procedure, and transmit, to the base station and based on determining the failure, a retransmission of at least a portion of the random access message.

In another aspect, an apparatus for wireless communication is provided that includes a transceiver, a memory configured to store instructions, and one or more processors communicatively coupled with the transceiver and the memory. The one or more processors are configured to receive, from a UE, a random access message transmitted by the UE in a two-step random access procedure, determine whether the random access message is an initial transmission or a retransmission of the random access message, and decode the random access message based on determining whether the random access message is the initial transmission or the retransmission.

In another aspect, an apparatus for wireless communication is provided that includes means for determining a failure associated with reception, by a base station, of an initial transmission of a random access message transmitted in a two-step random access procedure, and means for transmitting, to the base station and based on determining the failure, a retransmission of at least a portion of the random access message.

In another aspect, an apparatus for wireless communication is provided that includes means for receiving, from a UE, a random access message transmitted by the UE in a two-step random access procedure, means for determining whether the random access message is an initial transmission or a retransmission of the random access message, and means for decoding the random access message based on determining whether the random access message is the initial transmission or the retransmission.

In another aspect, a computer-readable medium including code executable by one or more processors for wireless communications is provided. The code includes code for determining, by a UE, a failure associated with reception, by a base station, of an initial transmission of a random access message transmitted by the UE in a two-step random access procedure, and transmitting, by the UE to the base station and based on determining the failure, a retransmission of at least a portion of the random access message.

In another aspect, a computer-readable medium including code executable by one or more processors for wireless communications is provided. The code includes code for receiving, from a UE, a random access message transmitted by the UE in a two-step random access procedure, determining whether the random access message is an initial transmission or a retransmission of the random access message, and decoding the random access message based on determining whether the random access message is the initial transmission or the retransmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
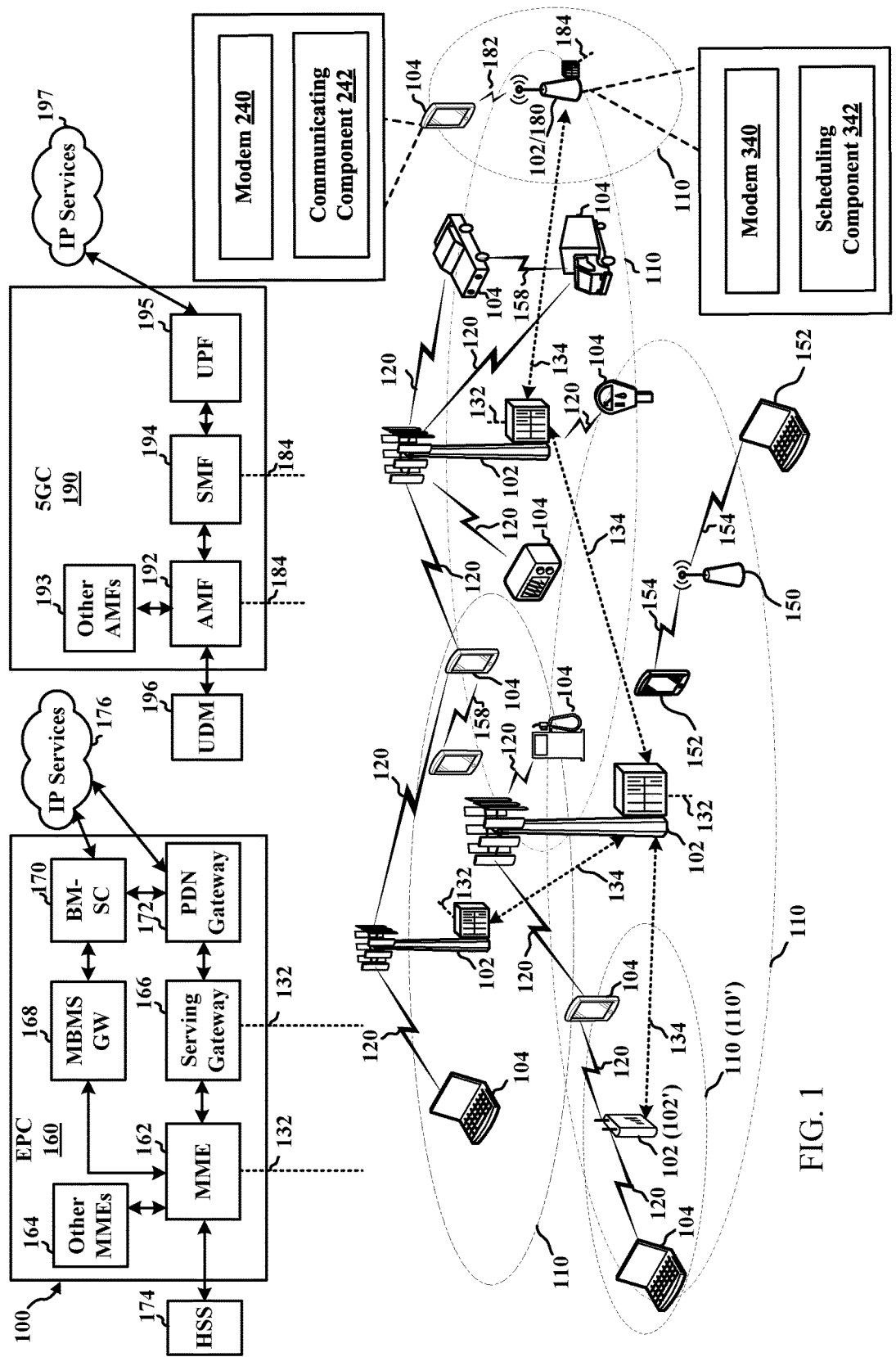
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to retransmitting messages in a two-step random access procedure, though the concepts may be applied to random access procedures with more or less than two steps as well. In two-step random access procedures, a base station can broadcast signals with parameters for establishing a connection with the base station. Such signals may include a synchronization signal block (SSB), system information blocks (SIBs), reference signals (RSs), and/or the like. A user equipment (UE) can receive the broadcast signals and can synchronize with the downlink from the base station, perform system information decoding and measurement, and/or the like. In addition, the UE can determine, based on parameters in the broadcast signals, one or more random access occasions for transmitting random access messages to establish a connection with the base station. When the UE desires to establish a connection with the base station, the UE can transmit a first message of the two-step random access procedure, which may include a preamble portion and a payload portion (e.g., where the payload portion can include physical uplink shared channel (PUSCH) data), and these portions may be transmitted as separated by a transmission gap in time. The base station can receive the first message (e.g., as the preamble and payload portions) and can transmit a response message to the UE, where the response message can include a random access response and/or contention resolution information.

As described, for example, there can be a transmission gap defined, and used by the UE, between the preamble portion and the payload portion of the first message. For example, the transmission gap can allow for timing adjustment (TA) for the first message transmission where the TA may be unknown or out of date. Moreover, for example, the transmission gap can allow for different numerology, bandwidth, beam selection, power control scheme, sampling rate for the preamble and payload, compatibility with a listen-before-talk (LBT) scheme (e.g., over a new radio (NR)-U interface), etc. between the preamble portion and the payload portion. In addition, for example, transmission of the preamble portion of the first message can include a guard time between transmissions (e.g., as defined by the wireless communication technology, such as NR, for any time division duplex (TDD) transmission of signals). In this example, the transmission gap may be reduced in view of the added guard time (as compared to not having a guard time). In an example, the transmission gap can also be reduced subject to a constraint that the transition period between an "end of ON power for physical random access channel (PRACH) and a "start of ON power for PUSCH)" is no less than a length of time mask. Additionally or alternatively, a timing adjustment applied to the payload may shorten the effective transmission gap.

Additionally, a transmit power time mask can be defined, and used by the UE in transmitting, where the mask can define one or more transient periods allowed between transmit OFF power and transmit ON power symbols (e.g., transmit ON/OFF defined in 3GPP technical specification (TS) 38.101), and/or allowed between continuous ON-power transmissions with power change or resource block (RB) hopping applied, etc. Where RB hopping is applied, for example, the transient period(s) related to each set of RBs can be symmetrically shared. In any case, transmission and/or retransmission of random access messages (e.g., and/or transmission/retransmission of preamble and payload portions of a first message) may be subject to the transmission gap and/or the transmit power time mask.

Aspects described herein relate to facilitating retransmitting of random access messages in random access procedures (e.g., two-step random access procedures). For example, retransmission of the first message (also referred to as "msgA") can be supported in two-step random access procedure (e.g., random access channel (RACH) procedure). For example, retransmission the preamble and/or payload of the first message can leverage time/frequency/space diversity to improve the performance. In another example, to facilitate coherent/non-coherent combining by the base station (e.g., gNB), the UE can repeat the initial transmission of the first message and/or can indicate whether the first message is new data or retransmission by using one or more parameters in one or more signals transmitted by the UE. In addition, retransmission of at least a portion of the first message can be triggered by one or more events, can use beam management to distinguish retransmissions, and/or the like. In this regard, the UE can receive feedback from the base station for the first RACH message or otherwise detect that the base station did not receive (or did not transmit feedback for) at least a portion of the first RACH message, and the UE can accordingly retransmit the first RACH message or portion thereof to the base station to allow the base station to properly receive and decode the first message.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting and/or retransmitting random access messages in a random access procedure. In addition, some nodes may have a modem 340 and scheduling component 342 for scheduling or otherwise enabling usage of resources for transmitting and/or retransmitting random access messages, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can broadcast information related to transmitting random access messages, and communicating component 242 can process the broadcast information and accordingly transmit a random access message during a random access occasion. Communicating component 242 can additional detect a trigger for retransmitting the random access message, or at least a portion thereof. For example, communicating component 242 may receive a response message from scheduling component 342 including feedback for the initial random access message, parameters for retransmitting the random access message, etc., and/or can detect that a response message is not received from the scheduling component 342 within a period of time. Communicating component 242 may accordingly retransmit at least a portion of the random access message, as described further herein.

Figure 2:
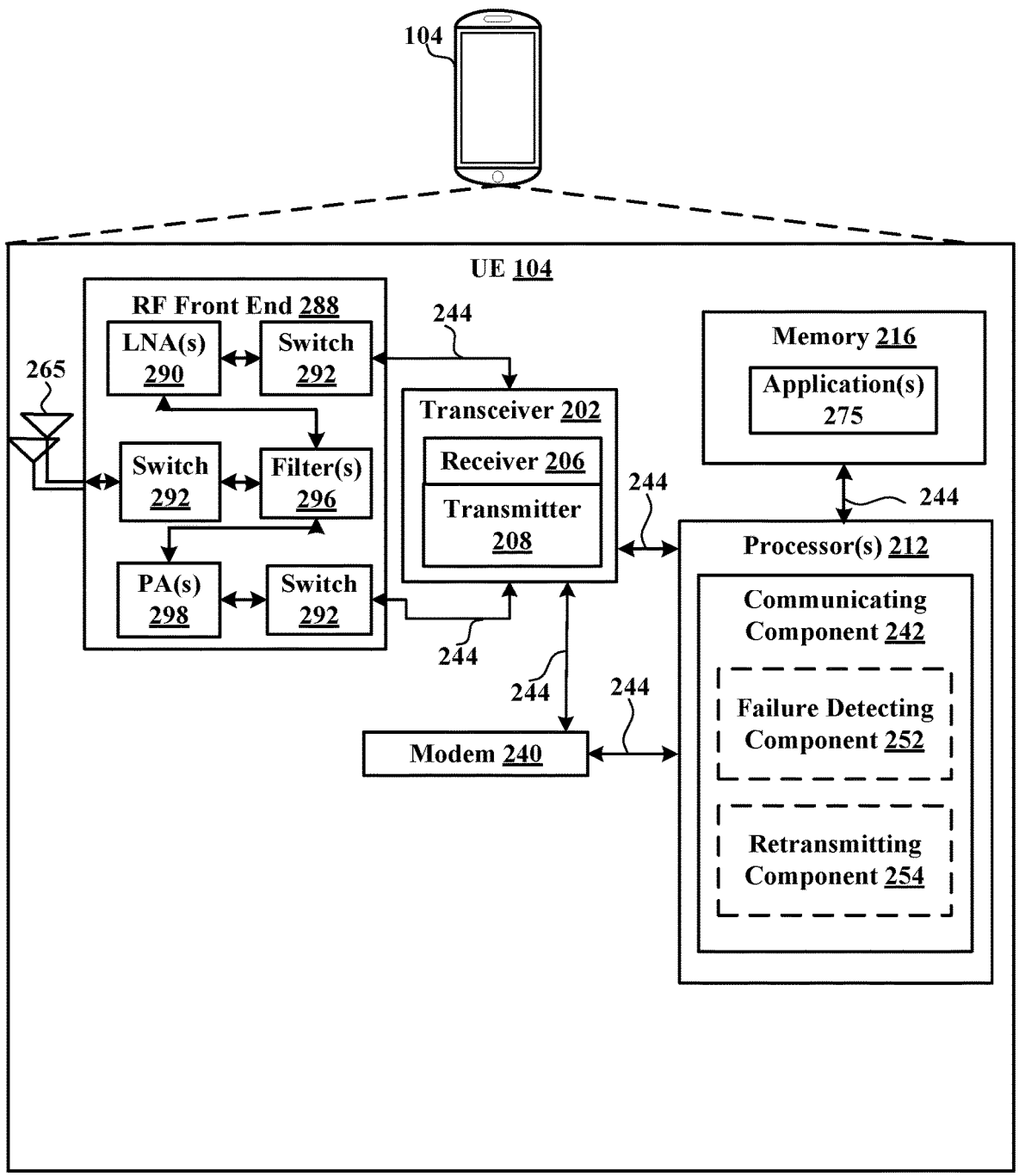
FIG. 2 is a block diagram illustrating an example of a UE, in accordance with various aspects of the present disclosure.
Figure 3:
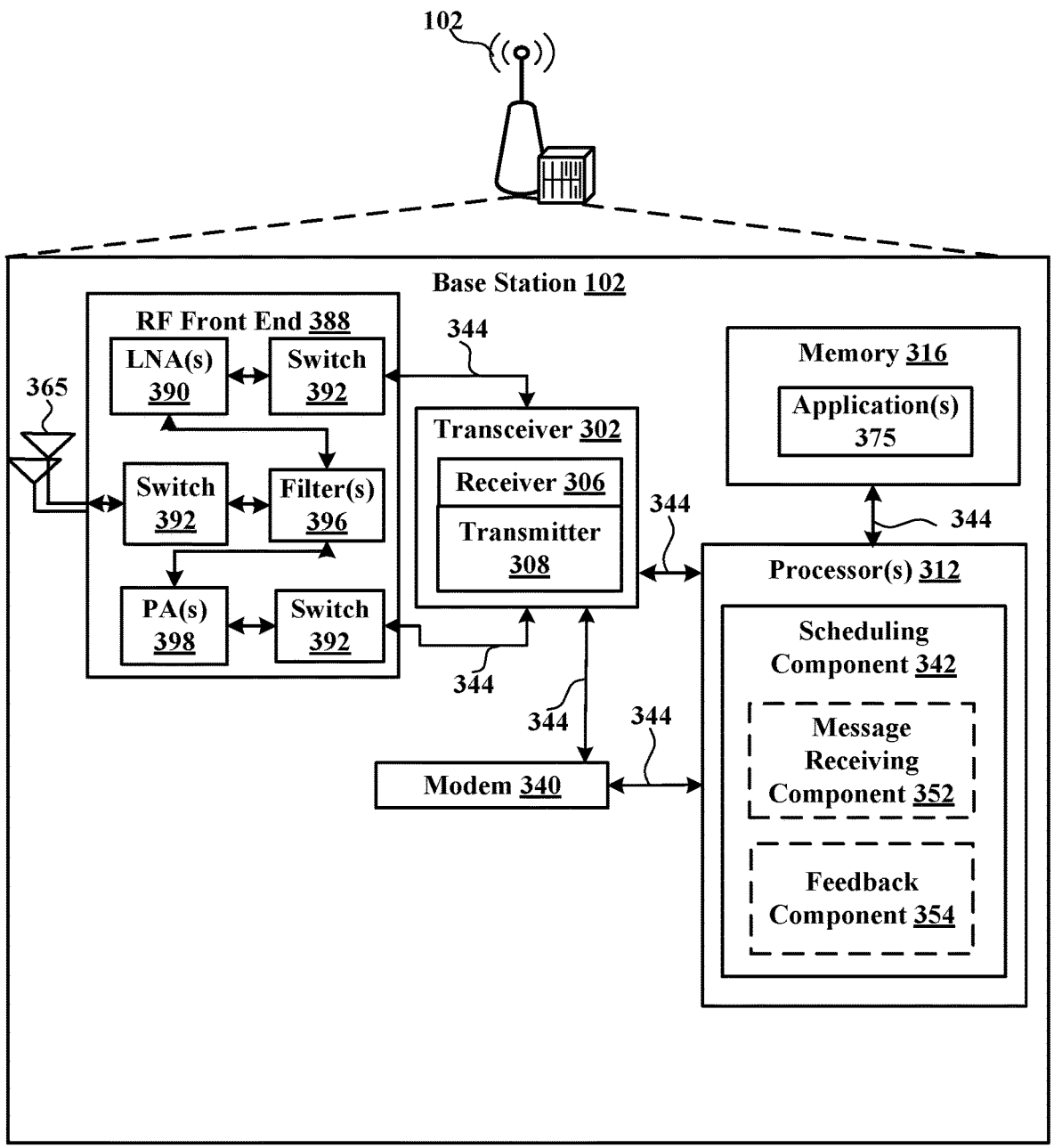
FIG. 3 is a block diagram illustrating an example of a base station, in accordance with various aspects of the present disclosure.
Figure 4:
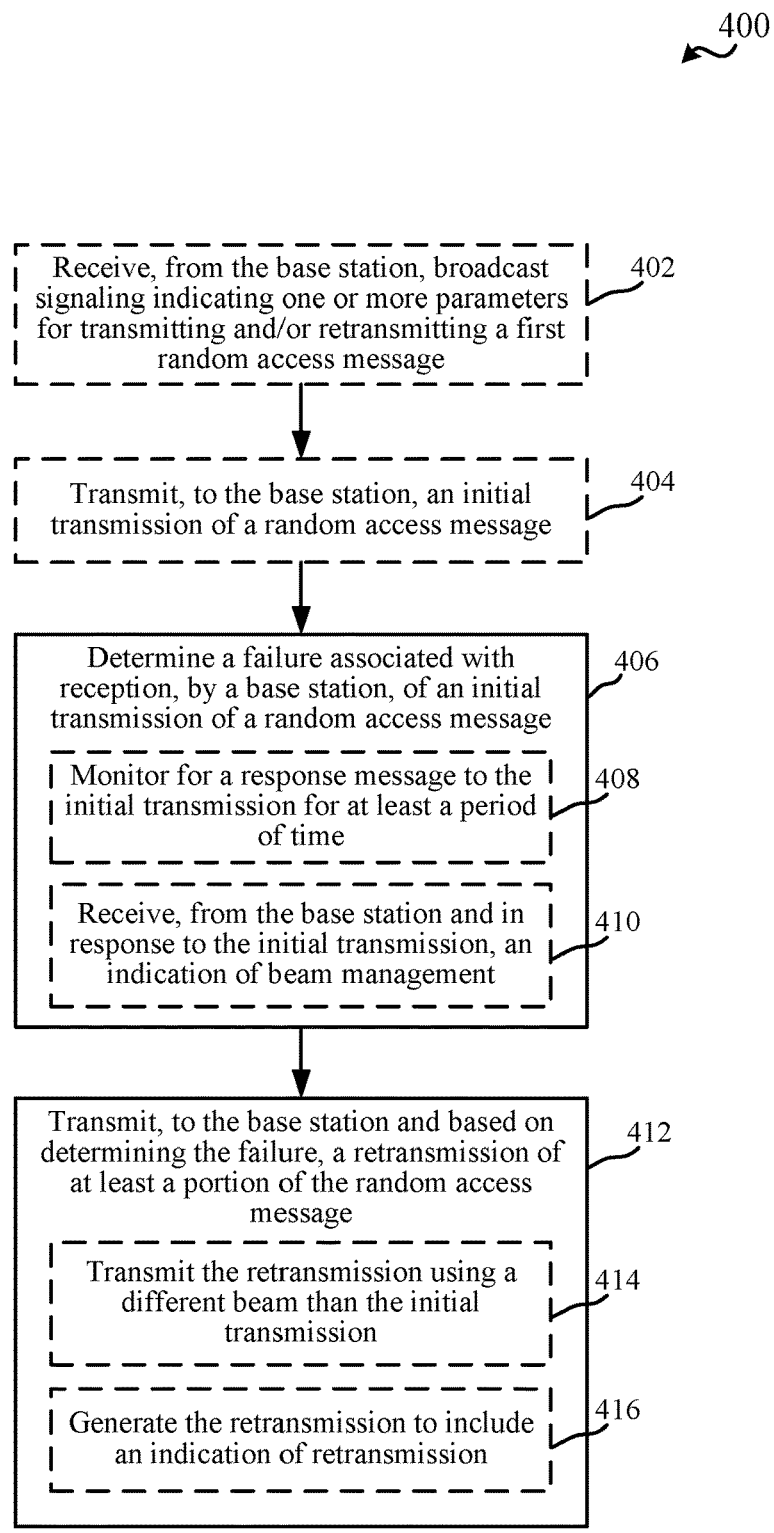
FIG. 4 is a flow chart illustrating an example of a method for retransmitting random access messages, in accordance with various aspects of the present disclosure.
Figure 5:
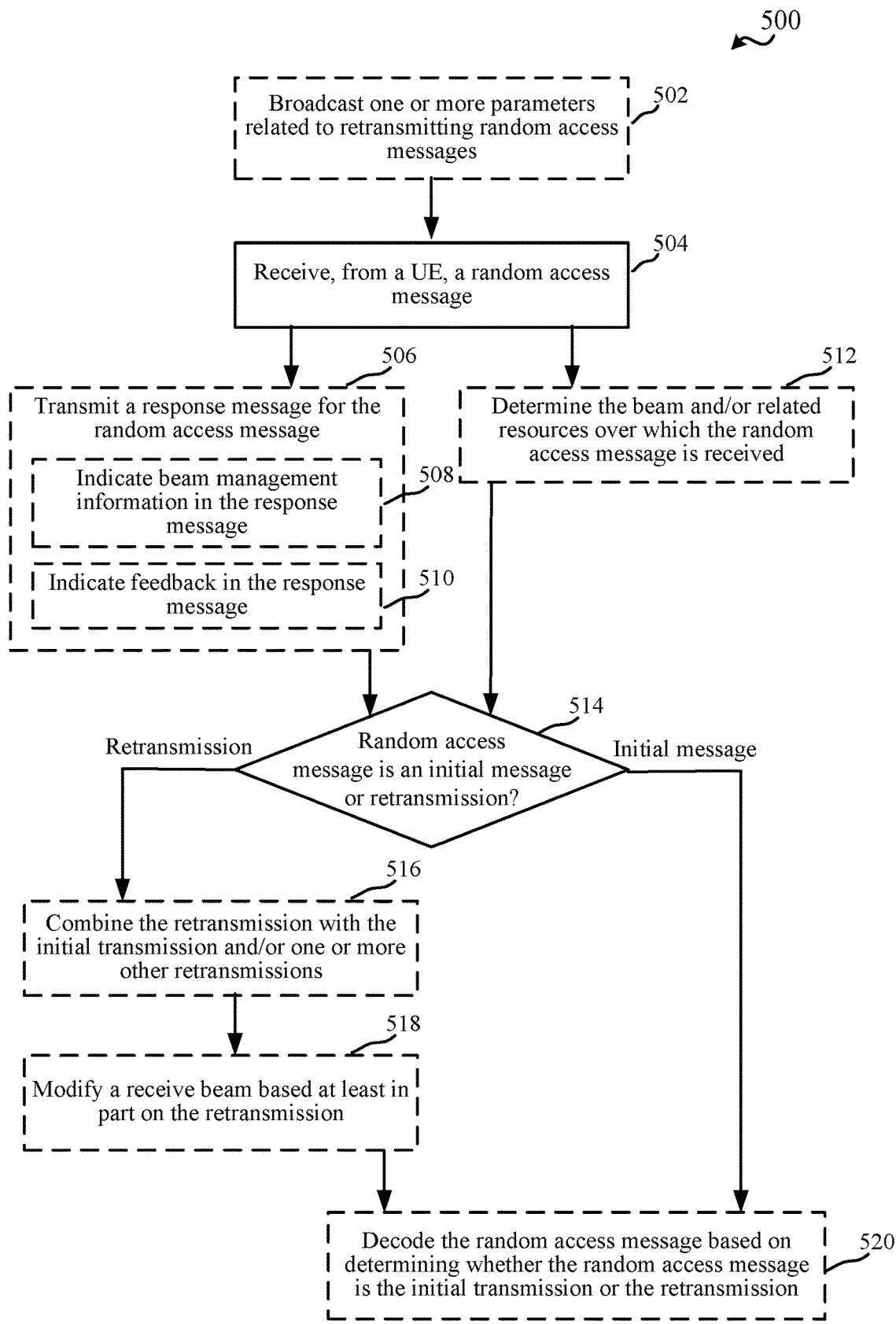
FIG. 5 is a flow chart illustrating an example of a method for receiving retransmissions of random access messages, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting and/or retransmitting random access messages.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a failure detecting component 252 for detecting that a random access message is not properly received by a base station, and/or a retransmitting component 254 for retransmitting the random access message.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling or otherwise enabling usage of resources for transmitting and/or retransmitting random access messages.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a message receiving component 352 for receiving a random access message, and/or a feedback component 354 for indicating feedback for the random access message.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for retransmitting a random access message. In an example, a UE 104 can perform the functions described in method 400 using one or more of the components described in FIGS. 1 and 2.

In method 400, optionally at Block 402, the UE 104 can receive broadcast signaling indicating one or more parameters for transmitting and/or retransmitting a first random access message. In an aspect, communicating component 242, e.g., in conjunction with processor(s) 212, memory 216, transceiver 202, etc., can receive, from the base station (e.g., base station 102), broadcast signaling indicating the one or more parameters for transmitting and/or retransmitting the first random access message. For example, the base station 102 can transmit broadcast signals over a known frequency spectrum for a wireless communication technology (e.g., LTE, NR, etc.), which may include a SSB, SIBs, RSs, etc., as described. The SIBs may indicate various system information parameters, which may include information regarding random access occasions for transmitting random access messages. In addition, in an example, the system information may include one or more parameters related to retransmitting random access messages as described further herein (e.g., different occasions for retransmissions, preamble sequences, resources or modulation and coding scheme (MC S) to use, sequences or cyclic shift combinations used by demodulation reference signal (DM-RS), durations of transmission gaps to use, explicit indicators to use, etc. in retransmitting random access messages).

In an example, communicating component 242 can determine a random access occasion for transmitting a random access message to the base station. In another example, communicating component 242 may additionally or alternatively determine parameters for retransmitting the random access message, as described further herein.

In method 400, optionally at Block 404, the UE 104 can transmit an initial transmission of a random access message to the base station. In an aspect, communicating component 242, e.g., in conjunction with processor(s) 212, memory 216, transceiver 202, etc., can transmit, to the base station (e.g., base station 102), the initial transmission of the random access message. For example, communicating component 242 can transmit the initial transmission in a random access occasion determined based on the received broadcast signaling. For example, the random access occasion may be indicated based on one or more parameters in the system information specifying a time period (or parameters from which a time period can be determined) for transmitting the random access message. In an example, the random access message can be a first message in a two-step random access procedure, and the random access message may include a preamble portion and a payload portion, as described. For example, the preamble portion may be similar to a RACH preamble defined in LTE/NR and the payload portion may include a PUSCH transmission of related PUSCH data. As described, the portions may be separately transmitted with a transmission gap and/or guard time in between, and the transmission gap and/or guard time may also be configured based on system information from the base station, in one example, determined from instructions stored in memory 216 based on compliance with a wireless communication technology (e.g., LTE/NR), etc.

In method 400, at Block 406, the UE 104 can determine a failure associated with reception, by a base station, of an initial transmission of a random access message. In an aspect, failure detecting component 252, e.g., in conjunction with processor(s) 212, memory 216, transceiver 202, communicating component 242, etc., can determine the failure associated with reception, by the base station (e.g., base station 102), of the initial transmission of the random access message (e.g., the initial transmission in Block 404). For example, failure detecting component 252 can determine the failure based on receiving feedback from the base station 102, based on detecting the feedback or a response message are not received within a threshold period of time (e.g., after transmitting the random access message), etc. In an example, failure detecting component 252 can determine the failure as a trigger for retransmitting the random access message, or at least a portion thereof, as described herein. In addition, for example, failure detecting component 252 can detect the failure as a failure to receive at least a portion of the random access message (e.g., the preamble portion or the payload portion), and/or may determine to retransmit the portion based on the detected failure.

In determining the failure at Block 406, optionally at Block 408, the UE can monitor for a response message to the initial transmission for at least a period of time. In an aspect, failure detecting component 252, e.g., in conjunction with processor(s) 212, memory 216, transceiver 202, communicating component 242, etc., can monitor for the response message (e.g., from the base station 102) for at least the period of time (e.g., the period of time measured from transmitting the initial transmission). In an example, failure detecting component 252 can monitor for the response message over resources associated with receiving the response message (e.g., a RACH or other channel and/or based on a radio network temporary identifier (RNTI) associated with a RACH procedure for the UE 104). For example, failure detecting component 252 can initialize a timer based on transmitting the initial transmission, and can determine the initial transmission is not received where the timer expires before a response to the initial transmission is received. This can indicate failure in receiving the random access message by the base station and/or can trigger retransmission of the random access message. In addition, for example, failure detecting component 252 may receive a response message that may indicate feedback for the random access message, which may also be a trigger for retransmitting the random access message (e.g., where the feedback indicates non-acknowledgement (NACK) for the random access message). The response message may also indicate parameters for retransmitting the random access message, in one example.

In determining the failure at Block 406, optionally at Block 410, the UE 104 can receive an indication of beam management from the base station and in response to the initial transmission. In an aspect, failure detecting component 252, e.g., in conjunction with processor(s) 212, memory 216, transceiver 202, communicating component 242, etc., can receive, from the base station (e.g., base station 102) and in response to the initial transmission, the indication of beam management. In an example, the receiving of the indication can indicate failure in receiving the random access message by the base station and/or can trigger retransmission of the random access message, where the retransmission may be based on the beam management. For example, the indication may be received as a response message to the initial transmission of the random access message, and may be received where the base station is unable to decode at least a portion of the random access message or otherwise does not receive at least a portion of the random access message (e.g., the preamble portion or the payload portion). The indication of beam management may specify beam information for retransmitting the random access message, which may use a different beam than that utilized for transmitting the initial transmission (e.g., at Block 404). For example, the beam management information may specify one or more parameters for beam switching from the beam used for the initial transmission or beam refining for the beam used for the initial transmission.

For example, the initial transmission of a msgA preamble and payload can consider different RACH beam configurations in association with cell-specific SSB beam setting. The retransmissions of msgA preamble and payload can consider RACH beam switching/refining, which are different from the beam configurations in the first transmission. In an example, the base station can order beam switching in downlink control information (DCI) of the response message (e.g., the response message also referred to as "msgB") for the retransmission of both preamble and payload of msgA, or payload of msgA only. The retransmission of preamble can help the base station with receive (RX) beam switching/refining. An example is shown in FIG. 6.

Figure 6:
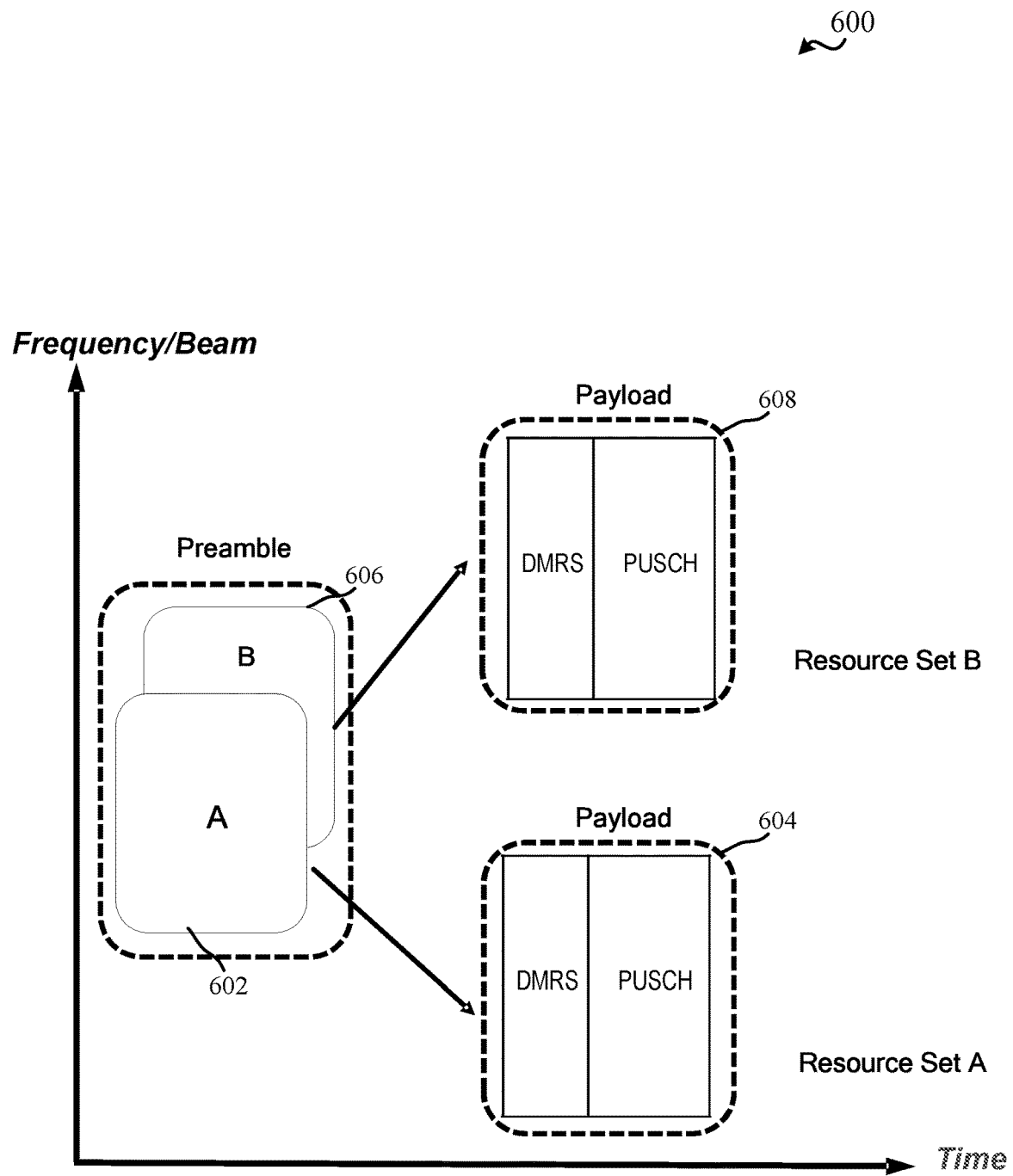
FIG. 6 illustrates an example of allocating resources for transmissions and/or retransmissions of random access messages, in accordance with various aspects of the present disclosure.

FIG. 6 illustrates an example of a resources 600 that can be allocated for initial transmissions and retransmissions of random access messages. For example, resources 600 includes a set of frequency/beam and time resources that can be allocated in a frequency spectrum for wireless communications. Resources 600 include a resource allocation 602 for an initial transmission of a preamble portion of a random access message, and a corresponding resource allocation 604 (e.g., separated from resource allocation 602 by a transmission gap) for transmission of a payload portion of the random access message (e.g., including PUSCH and corresponding DM-RS for demodulating the signal). In an example, communicating component 242 can select these resources for transmitting the portions of the random access message based on a random access occasion detected at the time of resource allocation 602 and using a beam determined based on the detected SSB from the base station 102. In addition, in an example, the base station 102 may specify parameters (e.g., in SIB) for determining the transmission gap and/or frequency/beam difference between the resource allocation 602 for the preamble portion and the resource allocation 604 for the payload portion.

In this example, failure detecting component 252 can detect that the initial transmission of the preamble portion or the payload portion is not received by the base station 102 or can otherwise receive a response message with feedback from the base station 102 indicating that at least a portion of the random access message is not received. The response message may specify the indication of beam management for retransmitting the random access message, which may include an indication of a beam to use in retransmitting the random access message, such as the beam shown for retransmitting the preamble in resource allocation 606 and/or the beam for retransmitting the payload portion in resource allocation 608. Thus, in one example, the indication of beam management, which may be received in the response message, may include beam information for both the preamble and payload portion, or only for one of the portions, etc. In the example, in FIG. 6, the base station may receive the first preamble and may indicate feedback, based on which the UE can retransmit the preamble in the second preamble portion and both corresponding payload portions. For example, UE 104 can transmit the first payload portion associated with the initial transmission of the preamble based on a beam/frequency (e.g., resource set A, as depicted) indicated for the payload portion (e.g., in system information) and/or can transmit the second payload portion associated with the retransmission of the preamble based on a different beam/frequency (e.g., resource set B, as depicted) indicated for the retransmission payload portion (e.g., in the system information, in a response message, which may include a response to the preamble or feedback for the preamble, etc.).

In method 400, at Block 412, the UE 104 can transmit a retransmission of at least a portion of the random access message to the base station and based on determining the failure. In an aspect, retransmitting component 254, e.g., in conjunction with processor(s) 212, memory 216, transceiver 202, communicating component 242, etc., can transmit, to the base station (e.g., base station 102) and based on determining the failure, the retransmission of at least a portion of the random access message. For example, retransmitting component 254 can retransmit at least the portion of the random access message to the base station by repeating at least the portion of the random access message (e.g., repeating the contents of at least the portion of the random access message in a different signal, such as redundancy version). In this regard, for example, the repeat of at least the portion of the random access message can have the same transport block size as the initial transmission of at least the portion of the random access message. In this regard, as described further herein, the base station receiving at least the portion of the random access message can combine the multiple received transmissions/retransmissions to improve performance of the received signal.

In one example, in transmitting the retransmission at Block 412, optionally at Block 414, the UE 104 can transmit the retransmission using a different beam than the initial transmission. In an aspect, retransmitting component 254, e.g., in conjunction with processor(s) 212, memory 216, transceiver 202, communicating component 242, etc., can transmit the retransmission using the different beam than the initial transmission. As described with reference to FIG. 6 above, for example, retransmitting component 254 can determine a different beam configuration for retransmitting the random access message, which can be indicated in a response message for the initial transmission or otherwise determined based on feedback for the initial transmission of the random access message. Thus, the initial transmission and retransmission may use distinct beams and/or corresponding frequency resources, in one example.

In another example, in transmitting the retransmission, retransmitting component 254 can retransmit the random access message based on one or more parameters indicated in the broadcast signaling from the base station 102. For example, the broadcast information may include one or more parameters indicating a mechanism to use to distinguish the retransmission from the initial transmission so the base station 102 can determine which is received from the UE 104. In this regard, for example, in transmitting the retransmission at Block 412, optionally at Block 416, the UE 104 can generate the retransmission to include an indication of retransmission. In an aspect, retransmitting component 254, e.g., in conjunction with processor(s) 212, memory 216, transceiver 202, communicating component 242, etc., can generate the retransmission to include an indication of retransmission or retransmission type. For example, retransmitting component 254 can generate the retransmission based on one or more parameters that can indicate retransmission, such as a preamble sequence, random access occasion, resource allocation, MCS, sequences/cyclic shift combination used for DM-RS, time duration of transmission gap, an explicit indication (e.g., a new data indicator (NDI) bit in the payload portion of the retransmission), and/or the like.

Thus, in an example, the retransmitting component 254 and communicating component 242 can use one or more of: different preamble sequences for new data (i.e., initial transmission) and retransmission (e.g., when both preamble and payload are retransmitted); different occasions for new data and retransmission (e.g., by puncturing the available preamble/PUSCH occasions); different resource allocation or MCS for new data and retransmission (e.g., by assigning different time/frequency offsets); different combinations of DM-RS sequences and cyclic shifts for new data and retransmissions; different configuration of transmission gap between preamble and payload for new data and retransmissions; etc. In an example, as described, these options can be configured and indicated by system information and/or by dynamic signaling from the base station 102 (e.g., in broadcast signaling or msgB, etc.). When msgA is repeated or retransmitted, the base station 102 can collect and combine multiple copies of msgA to improve the performance of received signal. In one example, it may be beneficial for UE to indicate explicitly to the base station whether its msgA carries new data or is a retransmission.

FIG. 5 illustrates a flow chart of an example of a method 500 for receiving transmissions and/or retransmissions of a random access message. In an example, a base station 102 can perform the functions described in method 500 using one or more of the components described in FIGS. 1 and 3.

In method 500, optionally at Block 502, the base station 102 can broadcast one or more parameters related to retransmitting random access messages. In an aspect, scheduling component 342, e.g., in conjunction with processor(s) 312, memory 316, transceiver 302, etc., can broadcast the one or more parameters related to retransmitting the random access messages. For example, scheduling component 342 can transmit SSB, SIBs, RSs, etc. that can include information for determining random access occasions, beam information to use in transmitting a random access message, parameters for retransmitting random access messages and/or the like, as described.

In method 500, at Block 504, the base station 102 can receive a random access message from a UE. In an aspect, message receiving component 352, e.g., in conjunction with processor(s) 312, memory 316, transceiver 302, scheduling component 342, etc., can receive, from the UE (e.g., UE 104), the random access message. For example, message receiving component 352 can receive the random access message in a random access occasion defined in broadcast system information, based on one or more beams transmitted in the SSB, etc., as described. In an example, the random access message may include one or more portions (e.g., a preamble portion and/or payload portion), and in one example, receiving the random access message may include receiving a portion of the random access message (e.g., a preamble portion). In an example, the random access message can be a first random access message in a two-step RACH procedure (e.g., msgA), as described.

In method 500, optionally at Block 506, the base station 102 can transmit a response message for the random access message. In an aspect, feedback component 354, e.g., in conjunction with processor(s) 312, memory 316, transceiver 302, scheduling component 342, etc., can transmit the response message for the random access message (e.g., where at least a preamble portion of the random access message is received and/or decoded by the base station 102). The response message, in one example, can include a random access response and/or contention resolution information (e.g., where the random access message is successfully received), and in one example can be a second random access message in a two-step RACH (e.g., msgB). In another example, the response message can include beam management information and/or feedback where the random access message is not successfully received and/or decoded (e.g., both portions).

Thus, for example, in transmitting the response message at Block 506, optionally at Block 508, the base station 102 can indicate beam management information in the response message. In an aspect, feedback component 354, e.g., in conjunction with processor(s) 312, memory 316, transceiver 302, scheduling component 342, etc., can indicate the beam management information in the response message. For example, feedback component 354 can indicate one or more of a beam to use in transmitting the retransmission and/or information from which the beam can be derived, a time period over which to retransmit the random access message, etc., as described above with respect to FIG. 6. Thus, in one example, feedback component 354 may indicate different beams for a preamble portion and payload portion of the random access message.

In addition, for example, in transmitting the response message at Block 506, optionally at Block 510, the base station 102 can indicate feedback in the response message. In an aspect, feedback component 354, e.g., in conjunction with processor(s) 312, memory 316, transceiver 302, scheduling component 342, etc., can indicate the feedback (e.g., ACK/NACK feedback) in the response message. For example, the feedback may indicate whether the initial transmission of the random access message is properly received and decoded, whether one or more portions of the initial transmission are received and decoded, etc.

In method 500, optionally at Block 512, the base station 102 can determine the beam and/or related resources over which the random access message is received. In an aspect, message receiving component 352, e.g., in conjunction with processor(s) 312, memory 316, transceiver 302, scheduling component 342, etc., can determine the beam and/or related resources over which the random access message is received. For example, the beam and/or related resources may be indicative of whether the random access message is an initial transmission or a retransmission; similarly, transmission of the response message at 506 can be indicative of the random access message being an initial transmission.

In any case, at Block 514, the base station 102 can determine whether the random access message is an initial message or retransmission. In an aspect, message receiving component 352, e.g., in conjunction with processor(s) 312, memory 316, transceiver 302, scheduling component 342, etc., can determine whether the random access message received from the UE (e.g., at Block 504) is an initial message or a retransmission. For example, message receiving component 352 may determine whether the random access message is an initial message or a retransmission based on one or more properties of the message. As described, for example, scheduling component 342 can broadcast parameters for retransmitting random access messages, such as different occasions for retransmissions, preamble sequences, resources to use, sequences/cyclic shift combinations to use for DM-RS, transmission gaps to use, explicit indicators to use, etc., and message receiving component 352 can determine whether the random access message is an initial message or retransmission based on one of these properties of the random access message. In another example, feedback component 354 can specify beam management information for retransmitting the random access messages, and thus message receiving component 352 may determine whether the random access message is an initial message or a retransmission based on the beam used to transmit the random access message.

Where the random access message is determined to be a retransmission at Block 514, optionally at Block 516, the base station 102 can combine the retransmission with the initial transmission and/or one or more other retransmissions. In an aspect, message receiving component 352, e.g., in conjunction with processor(s) 312, memory 316, transceiver 302, scheduling component 342, etc., can combine the retransmission with the initial transmission and/or one or more other retransmissions (e.g., to improve performance of the received signal). As described, for example, the retransmission may be a repeat of the initial transmission of the random access message (e.g., using the same message and/or properties, such as redundancy version, transport block size, etc.), which can allow the base station 102 to combine the transmissions to receive the message. In addition, in one example, optionally at Block 518, the base station 102 can modify a receive beam based at least in part on the retransmission. In an aspect, message receiving component 352, e.g., in conjunction with processor(s) 312, memory 316, transceiver 302, scheduling component 342, etc., can modify the receive beam based at least in part on the retransmission. For example, message receiving component 352 can modify the receive beam based on beam management information indicated in the response message to receive the retransmission of the random access message.

In any case, based on determining whether the random access message is the initial transmission or retransmission, optionally at Block 520, the base station 102 can decode the random access message based on determining whether the random access message is the initial transmission or the retransmission. In an aspect, message receiving component 352, e.g., in conjunction with processor(s) 312, memory 316, transceiver 302, scheduling component 342, etc., can decode the random access message based on determining whether the random access message is the initial transmission or the retransmission.

Figure 7:
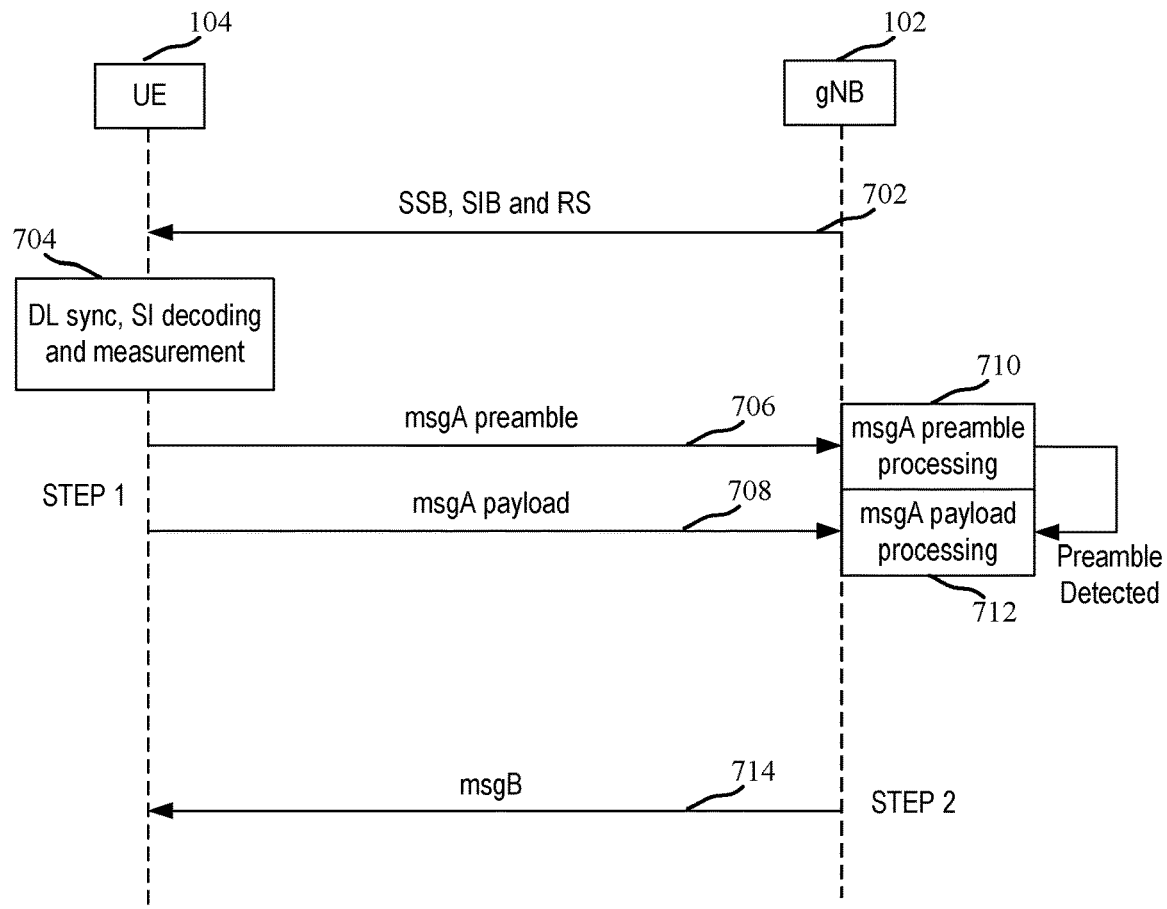
FIG. 7 illustrates an example of a system for transmitting and/or retransmitting random access messages, in accordance with various aspects of the present disclosure.

FIG. 7 illustrates an example of a system 700 for transmitting and/or providing feedback for random access messages in a two-step random access procedure. Before starting two-step RACH, UE receives and processes SSB/SIB/RS from the serving gNB. For example, system 700 includes a UE 104 that can transmit random access messages to a gNB 102 for requesting connection establishment therewith. In this example, gNB 102 can transmit SSB, SIB, and RS 702. The UE 104 can perform downlink synchronization, system information decoding, and/or measurements at 704. Based on the data in UE's 104 buffer, a UE-identifier and the system information, the UE 104 can generate a message A (msgA) and transmit it to gNB on a RACH occasion (RO) associated with a suitable SSB beam. The UE 104 can transmit msgA as a preamble portion 706 and a payload portion 708. After possibly receiving and processing msgA preamble/payload, gNB 102 can proceed as follows: if both preamble detection and payload decoding are successful at 710 and 712, gNB 102 can generate a message B (msgB) and transmit it to the two-step RACH UE 104 at 714, in which case, msgB can include a contention resolution ID or ACK for msgA payload; if preamble detection is successful at 710 but payload decoding fails at 712, gNB 102 can also generate a msgB and transmit it to the UE 104, in which case, msgB can include a random access preamble index (RAPID) or an ACK for msgA preamble, as well as a DCI for the retransmission of msgA, where the DCI can order both preamble and payload to be re-transmitted, or just request payload to be re-transmitted; or if neither preamble nor payload is detected at 710 and 712, gNB does not transmit msgB 714.

In this example, the UE 104 can monitor for msgB 714 after the completion of msgA transmission within a configured random access response (RAR) window and start a timer. If UE 104 successfully decodes a msgB 704 where msgB 704 includes remaining messages for the two-step random access procedure and/or an acknowledgement of receiving the random access message, UE 104 does not need to retransmit msgA. If UE 104 does not detect any msgB 714 when the timer expires, UE 104 can retransmit in a configured random access occasion using configured beam management options (e.g., based on the system information). If UE 104 detects a msgB with a non-acknowledgement for the payload and/or beam management information for transmitting the payload, UE 104 can stop the timer and retransmit msgA (e.g., by retransmitting the preamble portion 706 and/or the payload portion 708, which may be indicated in the msgB 714 as well) according to the DCI and system information.

Figure 8:
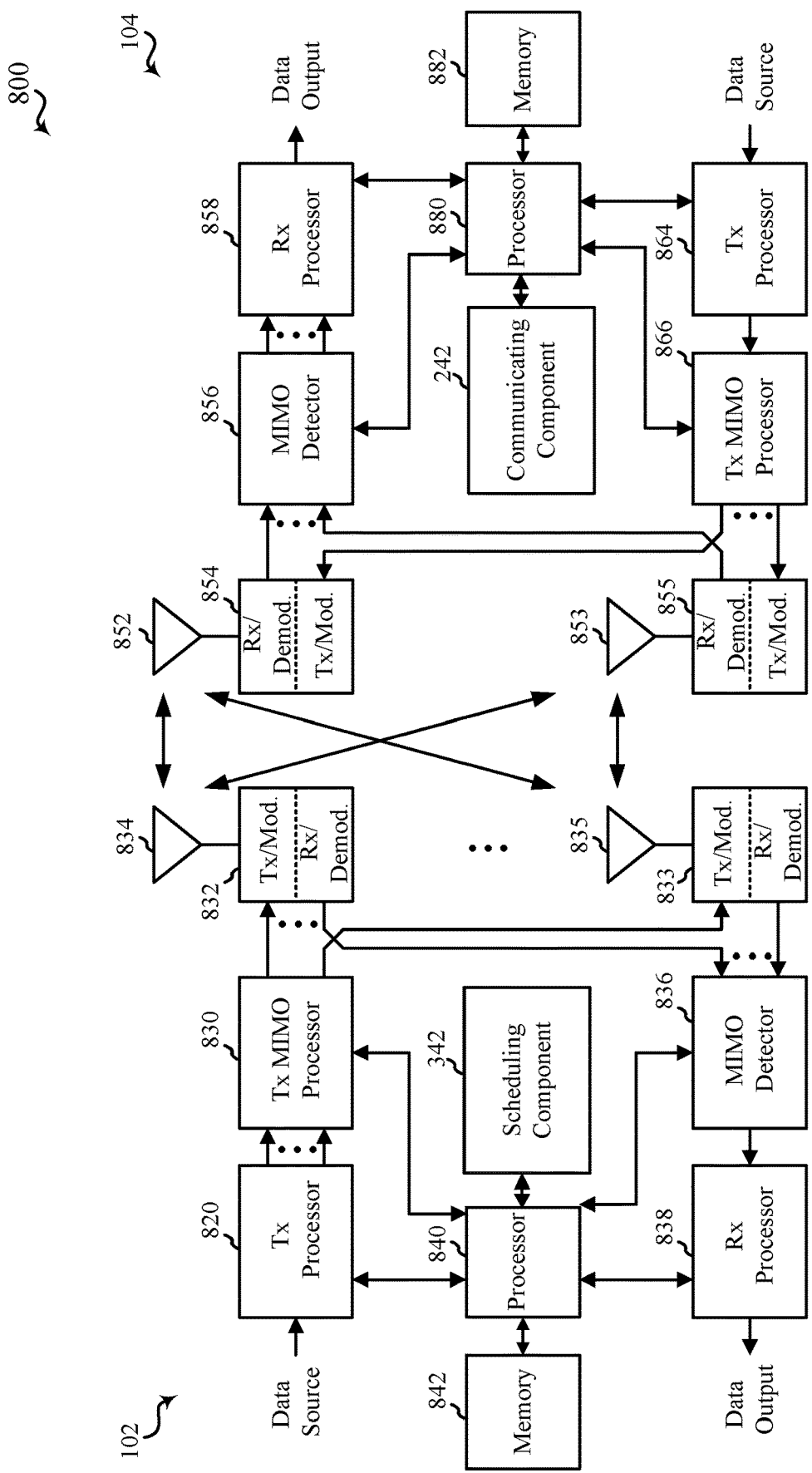
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
    determining, by a user equipment (UE), a failure associated with reception, by a base station, of an initial transmission of a random access message transmitted by the UE in a two-step random access procedure; and
    transmitting, by the UE to the base station and based on determining the failure, a retransmission of at least a portion of the random access message.

2. The method of example 1, wherein the retransmission is a repeat of the random access message.

3. The method of any of examples 1 or 2, wherein the retransmission is transmitted on a different beam than the initial transmission.

4. The method of any of examples 1 to 3, further comprising receiving, from the base station and in response to the initial transmission, an indication of beam management information including beam management signaling for beam switching or beam refining.

5. The method of example 4, wherein the indication of beam management information is part of downlink control information received from the base station.

6. The method of any of examples 4 or 5, wherein the indication further specifies the portion of the random access message to retransmit as including at least one of a preamble portion of the random access message and/or a payload portion of the random access message.

7. The method of any of examples 4 to 6, wherein the indication further specifies a first beam for retransmission of a preamble portion of the random access message and a second beam for retransmission of a payload portion of the random access message.

8. The method of any of examples 1 to 7, wherein the retransmission of the portion of the random access message comprises an indication of the retransmission type by the UE.

9. The method of example 8, wherein the indication of the retransmission type comprises configuring at least one of a different preamble sequence than that used for the initial transmission, a different occasion than that used for the initial transmission, a different resource allocation or modulation and coding scheme (MCS) than that used for the initial transmission, a different combination of sequences and/or cyclic shifts used by demodulation reference signals than that used for the initial transmission, a different transmission gap between a preamble portion and a payload portion than that used for the initial transmission, or an inclusion of a bit in the payload portion of the retransmission that indicates retransmission and not new data transmission.

10. The method of any of examples 8 or 9, further comprising determining a mechanism for including the indication and the configuration of the retransmission based on at least one of broadcast signaling or dynamic signaling from the base station.

11. The method of any of examples 1 to 10, further comprising monitoring for a response message from the base station to the initial transmission of the random access message, as defined in the two-step random access procedure, wherein determining the failure comprises determining that the response message is not received within a period of time after the initial transmission.

12. The method of any of examples 1 to 11, wherein the random access message includes a preamble, a payload including a demodulation reference signal and physical uplink shared channel, and a configurable transmission gap.

13. A method for wireless communication, comprising:
receiving, from a user equipment (UE), a random access message transmitted by the UE in a two-step random access procedure;
determining whether the random access message is an initial transmission or a retransmission of the random access message; and
decoding the random access message based on determining whether the random access message is the initial transmission or the retransmission.

14. The method of example 13, wherein determining comprises determining that the random access message is the retransmission based on one or more parameters associated with the retransmission.

15. The method of example 14, wherein decoding the random access message is based at least in part on combining the retransmission with the initial transmission and/or one or more other retransmissions of the random access message.

16. The method of any of examples 14 or 15, wherein the one or more parameters associated with the retransmission comprise at least one of a preamble sequence, a random access occasion, a resource allocation or modulation and coding scheme (MCS), a combination of sequences and/or cyclic shifts used for demodulation reference signals, a time duration of the transmission gap between a preamble portion and a payload portion, or an inclusion of a bit that indicates retransmission and not new data transmission.

17. The method of any of examples 14 to 16, further comprising transmitting a configuration of the one or more parameters to use in retransmitting the random access message.

18. The method of example 17, wherein transmitting the configuration comprises transmitting a broadcast signal indicating the one or more parameters.

19. The method of any of examples 13 to 18, wherein the determining comprises determining that the random access message is the retransmission based at least in part on receiving the initial transmission and transmitting a response message to the initial transmission, wherein the response message indicates a beam to use in transmitting the retransmission.

20. The method of example 19, wherein determining that the random access message is the retransmission is based at least in part on determining the beam and/or associated resources based on which the random access message is received.

21. The method of any of examples 19 or 20, wherein the response message indicates a first beam to use in retransmitting a preamble portion of the random access message and a second beam to use in retransmitting a payload portion of the random access message.

22. The method of any of examples 19 to 21, further comprising modifying, based at least in part on the retransmission, a receive beam of a base station receiving the random access message.

23. The method of any of examples 13 to 22, further comprising transmitting a response message to the initial transmission in the two-step random access procedure.

24. The method of example 23, wherein the response message indicates feedback for receiving at least a portion of the initial transmission.

25. The method of example 24, further comprising receiving the retransmission of the random access message based at least in part on the feedback.

26. An apparatus for wireless communication, comprising:
a transceiver;
a memory configured to store instructions; and
one or more processors communicatively coupled with the transceiver and the memory, wherein the one or more processors are configured to:
determine a failure associated with reception, by a base station, of an initial transmission of a random access message transmitted in a two-step random access procedure; and
transmit, to the base station and based on determining the failure, a retransmission of at least a portion of the random access message.

27. The apparatus of example 26, wherein the retransmission is a repeat of the random access message.

28. The apparatus of any of examples 26 or 27, wherein the one or more processors are configured to transmit the retransmission on a different beam than the initial transmission.

29. The apparatus of any of examples 26 to 28, wherein the one or more processors are further configured to receive, from the base station and in response to the initial transmission, an indication of beam management information including beam management signaling for beam switching or beam refining.

30. The apparatus of example 29, wherein the indication of beam management information is part of downlink control information received from the base station.

31. The apparatus of any of examples 29 or 30, wherein the indication further specifies the portion of the random access message to retransmit as including at least one of a preamble portion of the random access message and/or a payload portion of the random access message.

32. The apparatus of any of examples 29 to 31, wherein the indication further specifies a first beam for retransmission of a preamble portion of the random access message and a second beam for retransmission of a payload portion of the random access message.

33. The apparatus of any of examples 26 to 32, wherein the retransmission of the portion of the random access message comprises an indication of the retransmission type.

34. The apparatus of example 33, wherein the indication of the retransmission type comprises configuring at least one of a different preamble sequence than that used for the initial transmission, a different occasion than that used for the initial transmission, a different resource allocation or modulation and coding scheme (MCS) than that used for the initial transmission, a different combination of sequences and/or cyclic shifts used by demodulation reference signals than that used for the initial transmission, a different transmission gap between a preamble portion and a payload portion than that used for the initial transmission, or an inclusion of a bit in the payload portion of the retransmission that indicates retransmission and not new data transmission.

35. The apparatus of any of examples 33 or 34, wherein the one or more processors are further configured to determine a mechanism for including the indication and the configuration of the retransmission based on at least one of broadcast signaling or dynamic signaling from the base station.

36. The apparatus of any of examples 26 to 35, wherein the one or more processors are further configured to monitor for a response message from the base station to the initial transmission of the random access message, as defined in the two-step random access procedure, wherein the one or more processors are configured to determine the failure at least in part by determining that the response message is not received within a period of time after the initial transmission.

37. The apparatus of any of examples 26 to 36, wherein the random access message includes a preamble, a payload including a demodulation reference signal and physical uplink shared channel, and a configurable transmission gap.

38. An apparatus for wireless communication, comprising:
a transceiver;
a memory configured to store instructions; and
one or more processors communicatively coupled with the transceiver and the memory, wherein the one or more processors are configured to:
receive, from a user equipment (UE), a random access message transmitted by the UE in a two-step random access procedure;
determine whether the random access message is an initial transmission or a retransmission of the random access message; and
decode the random access message based on determining whether the random access message is the initial transmission or the retransmission.

39. The apparatus of example 38, wherein the one or more processors are configured to determine that the random access message is the retransmission based on one or more parameters associated with the retransmission.

40. The apparatus of example 39, wherein the one or more processors are further configured to decode the random access message at least in part by combining the retransmission with the initial transmission and/or one or more other retransmissions of the random access message.

41. The apparatus of any of examples 39 or 40, wherein the one or more parameters associated with the retransmission comprise at least one of a preamble sequence, a random access occasion, a resource allocation or modulation and coding scheme (MCS), a combination of sequences and/or cyclic shifts used for demodulation reference signals, a time duration of the transmission gap between a preamble portion and a payload portion, or an inclusion of a bit that indicates retransmission and not new data transmission.

42. The apparatus of any of examples 39 to 41, wherein the one or more processors are further configured to transmit a configuration of the one or more parameters to use in retransmitting the random access message.

43. The apparatus of example 42, wherein the one or more processors are configured to transmit the configuration in a broadcast signal indicating the one or more parameters.

44. The apparatus of any of examples 38 to 43, wherein the one or more processors are configured to determine that the random access message is the retransmission based at least in part on receiving the initial transmission and transmitting a response message to the initial transmission, wherein the response message indicates a beam to use in transmitting the retransmission.

45. The apparatus of example 44, wherein the one or more processors are configured to determine that the random access message is the retransmission based at least in part on determining the beam and/or associated resources based on which the random access message is received.

46. The apparatus of any of examples 44 or 45, wherein the response message indicates a first beam to use in retransmitting a preamble portion of the random access message and a second beam to use in retransmitting a payload portion of the random access message.

47. The apparatus of any of examples 44 to 46, wherein the one or more processors are further configured to modify, based at least in part on the retransmission, a receive beam of a base station receiving the random access message.

48. The apparatus of any of examples 38 to 47, wherein the one or more processors are further configured to transmit a response message to the initial transmission in the two-step random access procedure.

49. The apparatus of example 48, wherein the response message indicates feedback for receiving at least a portion of the initial transmission.

50. The apparatus of example 49, wherein the one or more processors are further configured to receive the retransmission of the random access message based at least in part on the feedback.

51. An apparatus for wireless communication, comprising:
means for determining a failure associated with reception, by a base station, of an initial transmission of a random access message transmitted in a two-step random access procedure; and
means for transmitting, to the base station and based on determining the failure, a retransmission of at least a portion of the random access message.

52. The apparatus of example 51, wherein the retransmission is a repeat of the random access message.

53. The apparatus of any of examples 51 or 52, wherein the means for transmitting transmits the retransmission on a different beam than the initial transmission.

54. An apparatus for wireless communication, comprising:
means for receiving, from a user equipment (UE), a random access message transmitted by the UE in a two-step random access procedure;
means for determining whether the random access message is an initial transmission or a retransmission of the random access message; and
means for decoding the random access message based on determining whether the random access message is the initial transmission or the retransmission.

55. The apparatus of example 54, wherein the means for determining determines that the random access message is the retransmission based on one or more parameters associated with the retransmission.

56. The apparatus of example 55, wherein the means for decoding decodes the random access message based at least in part on combining the retransmission with the initial transmission and/or one or more other retransmissions of the random access message.

57. A computer-readable medium, comprising code executable by one or more processors for wireless communications, the code comprising code for:
determining, by a user equipment (UE), a failure associated with reception, by a base station, of an initial transmission of a random access message transmitted by the UE in a two-step random access procedure; and
transmitting, by the UE to the base station and based on determining the failure, a retransmission of at least a portion of the random access message.

58. The computer-readable medium of example 57, wherein the retransmission is a repeat of the random access message.

59. The computer-readable medium of any of examples 57 or 58, wherein the code for transmitting transmits the retransmission on a different beam than the initial transmission.

60. A computer-readable medium, comprising code executable by one or more processors for wireless communications, the code comprising code for:
receiving, from a user equipment (UE), a random access message transmitted by the UE in a two-step random access procedure;
determining whether the random access message is an initial transmission or a retransmission of the random access message; and
decoding the random access message based on determining whether the random access message is the initial transmission or the retransmission.

61. The computer-readable medium of example 60, wherein the code for determining determines that the random access message is the retransmission based on one or more parameters associated with the retransmission.

62. The computer-readable medium of example 61, wherein the code for decoding decodes the random access message based at least in part on combining the retransmission with the initial transmission and/or one or more other retransmissions of the random access message.

What is claimed is:

1. A method for wireless communication performed by a user equipment (UE), comprising:
receiving, from a base station and in response to an initial transmission of a random access message transmitted by the UE in a two-step random access procedure, a response message, the initial transmission being based on a beam configuration associated with a synchronization signal block (SSB); and
transmitting, by the UE to the base station and based on the response message, a retransmission of at least a portion of the random access message, the portion of the random access message comprising a payload of the random access message,
wherein the retransmission is transmitted on a different beam than the initial transmission, the different beam being based a different beam configuration from the beam configuration associated with the SSB.

2. The method of claim 1,
wherein the retransmission of the at least a portion of the random access message is transmitted via a different random access occasion from the initial transmission.

3. An apparatus for wireless communication, comprising:
a transceiver;
a memory configured to store instructions; and
one or more processors communicatively coupled with the transceiver and the memory, wherein the one or more processors are configured to:
receive, from a base station and in response to an initial transmission of a random access message transmitted by the apparatus in a two-step random access procedure, a response message, the initial transmission being based on a beam configuration associated with a synchronization signal block (SSB); and
transmit, to the base station and based on the response message, a retransmission of at least a portion of the random access message, the portion of the random access message comprising a payload of the random access message,
wherein the retransmission is transmitted on a different beam than the initial transmission, the different beam being based a different beam configuration from the beam configuration associated with the SSB.

4. The apparatus of claim 3, wherein the retransmission of the at least a portion of the random access message is transmitted via a different random access occasion from the initial transmission.

5. An apparatus for wireless communication, comprising:
a transceiver;
a memory configured to store instructions;
one or more processors communicatively coupled with the transceiver and the memory, wherein the one or more processors are configured to:
receive, from a user equipment (UE), an initial transmission of a random access message in a two-step random access procedure, the initial transmission being based on a beam configuration associated with a synchronization signal block (SSB);
transmit, in response to the initial transmission of the random access message, a response message; and
receive, from the UE, a retransmission of at least a portion of the random access message, the portion of the random access message comprising a payload of the random access message,
wherein the retransmission is received on a different beam than the initial transmission, the different beam being based a different beam configuration from the beam configuration associated with the SSB.

6. The apparatus of claim 5, wherein the retransmission of at the least a portion of the random access message is received via a different random access occasion from the initial transmission.

7. An apparatus for wireless communication, comprising:
a transceiver;
a memory configured to store instructions;
one or more processors communicatively coupled with the transceiver and the memory, wherein the one or more processors are configured to:
  receive, from a user equipment (UE), an initial transmission of a random access message in a two-step random access procedure;
  transmit, to the UE, a response message in response to the initial transmission of a random access message;
  receive, from the UE, a retransmission of at least a portion of the random access message, the portion of the random access message comprising a payload of the random access message,
  wherein the one or more processors are configured to receive the retransmission on a different beam than the initial transmission, and a switch to the different beam is based on the response message.

* * * * *